Figure 1:
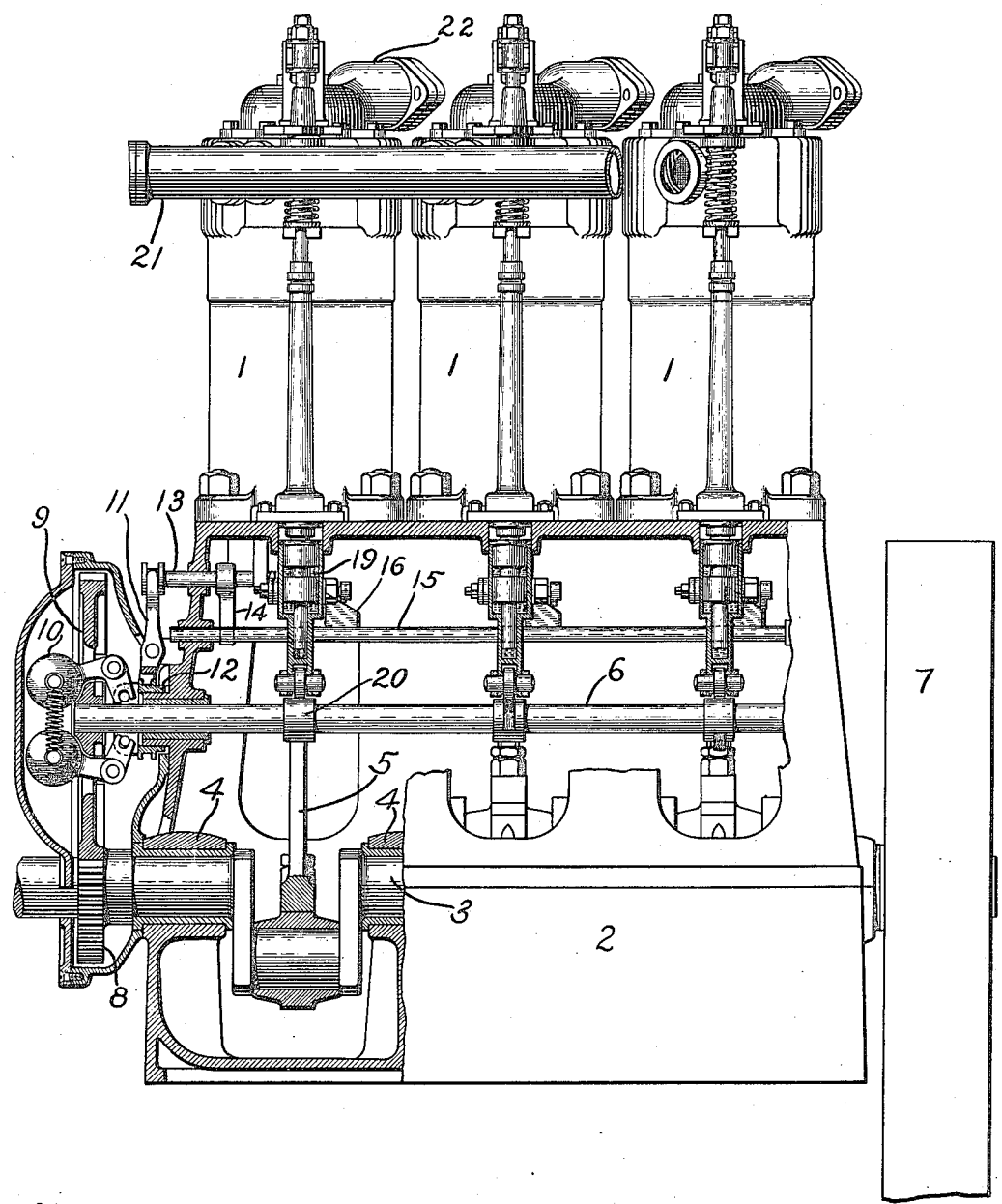

E. THOMSON.
VALVE MECHANISM FOR ENGINES.
APPLICATION FILED FEB. 27, 1906.

1,080,733.

Patented Dec. 9, 1913.

2 SHEETS—SHEET 1.

Witnesses:

Inventor,
Elihu Thomson,
By Albert ... Davis
Atty.

E. THOMSON.
VALVE MECHANISM FOR ENGINES.
APPLICATION FILED FEB. 27, 1906.
1,080,733.
Patented Dec. 9, 1913.
2 SHEETS—SHEET 2.
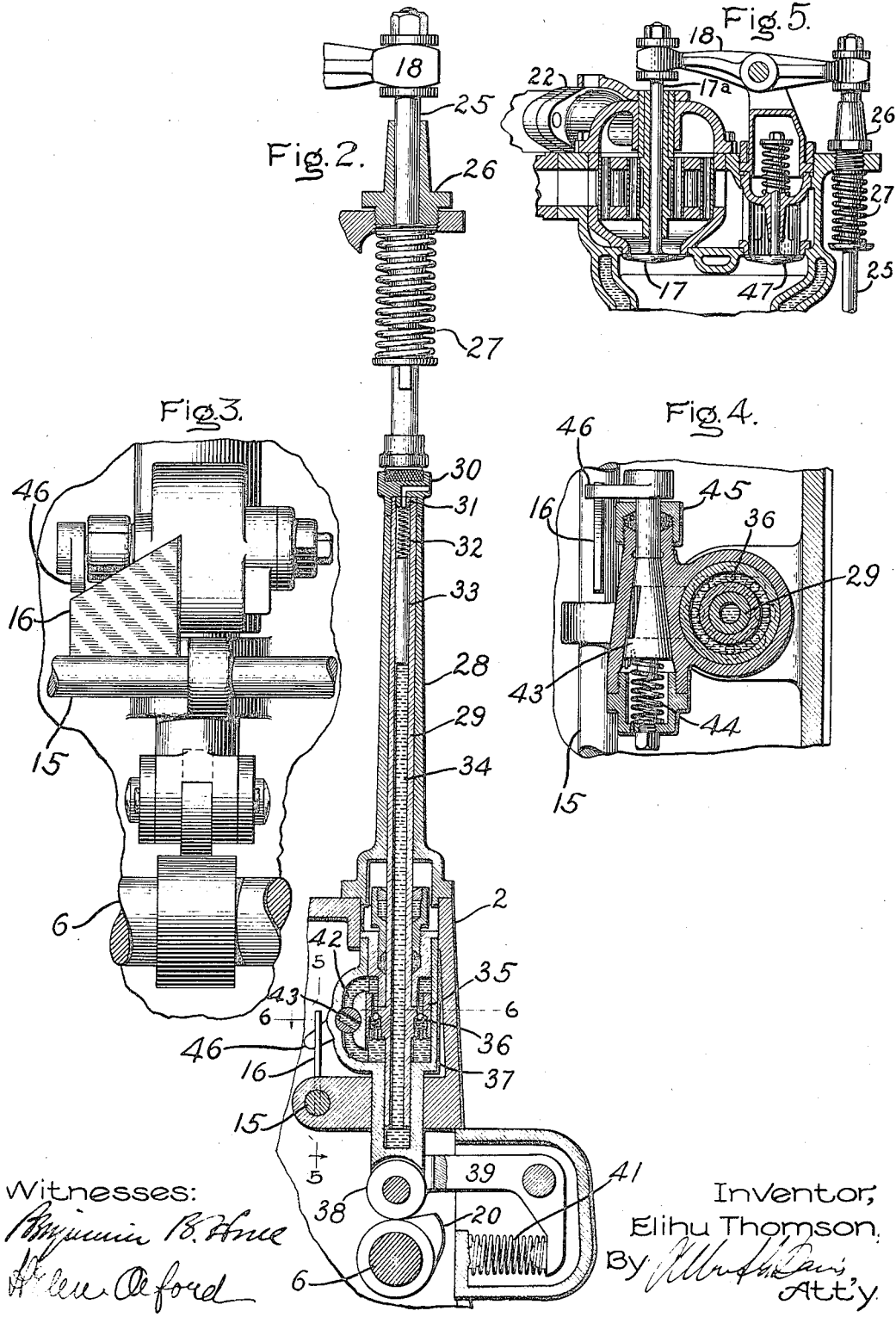
Witnesses:
Inventor,
Elihu Thomson,
By
Att'y

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

VALVE MECHANISM FOR ENGINES.

1,080,733.  Specification of Letters Patent.  Patented Dec. 9, 1913.

Application filed February 27, 1906. Serial No. 303,174.

*To all whom it may concern:*

Be it known that I, ELIHU THOMSON, a citizen of the United States, residing at Swampscott, county of Essex, State of Massachusetts, have invented certain new and useful Improvements in Valve Mechanism for Engines, of which the following is a specification.

The present invention has for its object to improve the construction and operation of the valve mechanism for internal combustion or other engines, and particularly that part which controls the valve or valves whereby the period that the valve is kept open on a given stroke or under a given condition, can be varied from a minimum to a maximum to meet the conditions of load. This result is attained by means of a hydraulic device incorporated in said part of the valve mechanism.

In the accompanying drawings, which illustrate one of the embodiments of my invention, Figure 1 is a front elevation of a multi-cylinder engine with certain of the parts broken away; Fig. 2 is an enlarged view in section of the hydraulic means for operating an exhaust valve; Fig. 3 is a detail view of the governor adjusting means for controlling the action of the hydraulic lock or clutch, the said view being taken on line 5—5 of Fig. 2; Fig. 4 is a horizontal section taken on line 6—6 of Fig. 2; and Fig. 5 is a section through the admission and exhaust valves.

1 represents the cylinder of an internal combustion engine of which there may be one, two, three or more. The cylinder or cylinders are removably secured to a crank case and bed plate 2 containing a chamber for the crank shaft 3, bearings 4, connecting rods 5, cam shaft 6 and various other parts to be referred to later. On one end of the crank shaft is a fly-wheel, pulley or other driving means 7, and on the opposite end a pinion 8 meshing with a gear 9 carried by the low speed or cam shaft 6. Mounted upon the cam shaft is a centrifugal governor 10 which by its movement controls the period of opening and closing of the exhaust valve or valves of the engine. It may also control one or more admission valves, or both admission and exhaust valves. Motion is communicated from the governor weights to an upright lever 11 through the sliding collar 12. The upper end of the lever is forked to receive the rod 13. This rod is provided with an arm 14 that moves the actuator 15 longitudinally. Mounted upon the actuator are cams 16, one for each cylinder. Each cam is provided with an inclined surface to engage with the lever of a by-pass valve as will appear hereinafter. Each cylinder is provided with an exhaust valve 17, Fig. 5, having a stem 17ª projecting upward through a cap bolted to the cylinder head. The valve is actuated by a horizontal lever 18, and the lever in turn is operated by a cam on the shaft 6 through the medium of a divided rod and a hydraulic lock or clutch 19. As shown in Fig. 1, three of these devices are provided. Mounted on the cam shaft 6 and in line with each of the valve actuators is a cam 20 for moving it. Gas or other motive fluid is admitted to the engine by the conduit 21 and the exhaust therefrom is taken care of by the conduits 22; the exhaust valve or valves 17 controlling its passage.

Referring to Figs. 2 and 4, the construction of the valve operating mechanism will be described. 18 represents the lever that is connected to the valve stem 17ª. This lever is actuated by a rod 25, which is provided with a guide 26. Situated below the guide and tending at all times to force the rod downward, is an outside compression spring 27. Mounted upon a suitable part of the engine frame 2 is a vertically extending tubular casing 28. Located inside of the casing and extending longitudinally thereof is a tube 29. The upper end of the tube is provided with a head 30, and the latter is arranged to receive the lower end of the rod 25, there being a sufficient clearance when the parts are as shown to insure seating of the valve 17. In some cases this separation of the parts can be dispensed with. The upper end of the tube is also provided with a screw-threaded plug 31 having a small orifice therein communicating with the atmosphere to prevent a vacuum being formed, the said plug serving as a fixed abutment for the compression spring 32. Seated against the lower end of the spring is a piston 33, which is normally maintained in contact with the column of fluid 34 in the tube. The object of this piston is to prevent churning of the liquid within the sleeve and also to restrict its flow somewhat and prevent it from leaking out at the top. On the lower end of the tube is a piston 35 having one, two or more ball valves 36 that are normally pressed upward by the springs on the underside. The valve or valves are so arranged that when the cylinder 37 containing the piston is lowered they will open and let the liquid pass from the upper to the underside of the piston. The cylinder 37 has a downwardly extending portion carrying the roller 38 and is connected to the lever 39.

The roller 38 is adapted to move up and down with the cylinder as the cam 20 rotates, the said cam lifting the cylinder, the compression spring 41 returning it. The lower end of the tube 29 is open so that any fluid which may leak from the cylinder will not be pocketed below it and form a stop. If the relative movements of the piston and cylinder create a vacuum, fluid will tend to pass from the interior of the tube to the cylinder. It will be seen that the tube forms in effect a reservoir or accumulator. In the side of the cylinder is formed a by-pass 42 that is under the control of the by-pass valve 43. When this valve is open the cylinder 37 can rise and fall without imparting movement to the piston because the fluid will pass from one side to the other of the piston through the by-pass as the cylinder is moved by the cam 20 and spring 41. On the other hand, if the by-pass valve is closed, the body of liquid held between the cylinder and the lower face of the piston, and between the cylinder and the upper face of the piston, being an incompressible body, acts to transmit the full stroke of the cam to the valve. A partial opening of the by-pass valve will permit of a partial opening of the exhaust valve to suit the conditions of service. The normal tendency of the by-pass valve is to assume a closed position. This is effected by means of the adjustable torsional spring 44, Fig. 4, which spring also tends to hold the valve against its tapered seat. The end of the valve stem projects through a boss on the cylinder and is provided with a suitable stuffing box 45.

Mounted on the end of the stem is a lever 46 that is adapted to engage the cam 16 carried by the longitudinally moving actuator 15, Figs. 1 and 3. It will be seen that the two parts of the valve rod,—i. e., the piston and cylinder, are hydraulically locked or clutched together under the control of the by-pass valve when it is desired to open the exhaust valve and are released by the by-pass valve when the load conditions require the exhaust valve to remain closed. It will further be seen that by partially opening the by-pass valve the two parts of the valve rod are permitted to slip more or less with respect to each other. The cylinder 37 is moved up and down once for each revolution of the cam shaft 6, and it follows that the by-pass valve and its actuating lever 46 are similarly moved up and down with respect to the cam 16. This cam by reason of its support 15 and the shaft governor is adjustable in a plane at right angles to the axis of the valve rod and the point where the cam will engage the lever 46 and open the valve on the down stroke will vary in accordance with the load. The point where the spring 44 on the upward stroke closes the valve also depends upon the load upon the engine. In some cases, as, for example, where the load is light, the by-pass valve will be open through the major portion of the upward stroke of the cylinder 37 and the piston will be stationary. This means that the lever 46 is engaging the cam well toward its upper end. Under this condition the exhaust valve will be open for only a very brief interval of time for each revolution of the cam shaft 6. On the other hand, if the load is heavy the governor will shift the cam 16 to a position corresponding to that shown in Fig. 3, the by-pass valve will be closed the major portion of the stroke, and the exhaust valve will be fully opened and remain so for a longer portion of the stroke of the piston or pistons of the engine, and discharge all or a large portion of the burned products of combustion. The main piston will on its next stroke draw in a charge of combustible through the admission valve 47, Fig. 5, and then compress it prior to the firing stroke. I may use any suitable form of ignition device to fire the charge.

Where the engine is provided with more than one cylinder, corresponding exhaust valves are provided therefor and the cams for operating them are so set with reference to each other that they will operate to produce successive working strokes of the pistons in the different cylinders. In this case the actuator 15 is common to all of the cams, and so is the speed governor 10 that moves the actuator.

In a broad sense it will be seen that the valves are opened by hydraulic means interposed between them and the driving element of the engine, and in a more limited sense that a divided valve actuator is provided, the parts of which are locked or clutched together by hydraulic means responding to the action of the speed or load-responsive device. The valve or valves may be operated indirectly or directly by the valve rod as desired.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. An engine having a cylinder, a piston, a crank shaft driven by the piston, a main valve controlling the passage of fluid through the cylinder, a lever for operating the valve, and a normally fixed fulcrum for the lever which is mounted on the cylinder, in combination with means for actuating the lever comprising members capable of relative movement and a body of normally quiescent fluid for transmitting motion from one to the other, a valve controlled passage for locking and unlocking the fluid between the members, a means for moving one of the members, and a speed responsive device for adjusting the valve in said passage.

2. In an engine having a stationary and a movable element, a main shaft driven by the movable element, a valve controlling the passage of motive fluid, a lever for operating the valve and a normally fixed fulcrum for the lever which is mounted on the stationary element, the combination of a divided actuator for the lever between the parts of which motion is imparted by a body of liquid, and a means for rendering the liquid ineffective when it is desired to leave the valve in a given position and for rendering it effective when it is desired to have the parts of the actuator move together.

3. In an engine having a cylinder, a piston, a main shaft driven thereby, and a main valve controlling the passage of motive fluid through the cylinder, the combination of a piston and a cylinder for operating the main valve through the medium of a body of liquid, a second valve for releasing the liquid on opposite sides of the piston when it is desired to leave the main valve idle and for confining said liquid when it is desired to actuate the main valve, a device which tends to close the second valve at all times, and governor mechanism for controlling the action of the device on the second valve.

4. In an engine having a cylinder, a piston, a main shaft driven thereby, a valve controlling the passage of motive fluid through the cylinder, a lever for operating the valve, and a fixed fulcrum for the lever which is mounted on the cylinder, the combination of a divided actuator for actuating the lever, a cam for moving the parts of the actuator through a fluid medium, and a governor-controlled means regulating the action of the fluid medium for connecting and disconnecting the parts of the actuator.

5. In an engine having a movable and a stationary element, a main shaft driven by the movable element, a valve controlling the passage of fluid, a lever for operating the valve, a normally fixed fulcrum for the lever which is mounted on the stationary element, and a secondary shaft driven at a lower speed than the main shaft, the combination of a divided actuator for the lever comprising parts that are connected through a body of liquid, a cam on the secondary shaft for moving one part of the actuator, and means for connecting and disconnecting the parts of the actuator through the medium of the liquid.

6. In an engine having a movable and a stationary element, a main shaft driven by the movable element, and a valve controlling the passage of fluid, the combination of actuating means for the valve including parts which are normally movable independently of each other but which can be locked by an interposed body of liquid, a by-pass valve for locking the parts by confining the liquid and for releasing them by opening a passage around one of the parts, means which tends at all times to close the by-pass valve and lock the parts, and a device responsive to load changes which controls the action of said means on the by-pass valve.

7. In an engine having a piston, a cylinder, a main valve controlling the passage of motive fluid through the cylinder, a low speed shaft, and a cam driven thereby, the combination of an actuator for the main valve including a piston and cylinder, one of said parts being moved directly by the cam and the other moving the valve, a by-pass valve carried by the part moved by the cam to control the passage of a body of liquid from one side of the piston to the other, a device which tends at all times to close the by-pass valve, and a governor for controlling the action of said device on the by-pass valve and thereby regulating the movement of the main valve.

8. In an engine having a piston, a cylinder, a valve for controlling the passage of motive fluid through the cylinder, a lever for operating the valve, and a fixed fulcrum for the lever which is mounted on the cylinder, the combination of an actuator for the lever including a piston and a cylinder, the latter containing a body of liquid through which the force to move the valve is transmitted, means acting directly on one of said parts to move it, a spring tending to move the piston in the cylinder, and a speed governor controlling the movements of the piston and cylinder with respect to each other.

9. In an engine having a piston, a cylinder, and a valve controlling the passage of motive fluid through the cylinder, the combination of a valve actuator including a piston and a cylinder, the latter containing a body of liquid, a valve mounted in the actuator piston which opens on the suction stroke of the piston and cylinder to permit liquid to pass from one side of said piston to the other, and a governor-controlled by-pass valve that locks and unlocks the piston and cylinder with respect to their relative movement.

10. In an engine having a movable and a stationary element, a main shaft driven by the movable element, and a valve regulating the passage of motive fluid, the combination of an actuator for the valve including a piston and cylinder, a tube for supporting the piston that is open at one end to receive liquid, a by-pass around the piston, and a governor-controlled valve in the by-pass.

11. In an engine having a main piston, a main cylinder, and a main valve mounted on the cylinder for controlling the passage of motive fluid, the combination of an actuator for the valve including a cylinder mounted for axial movement, a piston in the actuator cylinder, a piston rod which projects from the actuator cylinder and is connected to the valve, means for imparting a reciprocating movement to the actuator cylinder, a body of liquid in the actuator cylinder, a by-pass connecting the opposite ends of said cylinder, a rotary valve in the by-pass for controlling the flow of liquid therethrough to lock or unlock the actuator piston and cylinder with respect to their relative movement, a spring which tends at all times to close the by-pass valve, a cam which may act to open the by-pass valve in opposition to the spring, and a governor responsive to changes in the speed of the engine which moves the cam to vary its action on the by-pass valve and thereby regulate the movement of the main valve.

12. An engine having a cylinder, a piston, a crank shaft driven by the piston, a conduit, a valve controlling the flow of fluid between the conduit and the cylinder, a cam shaft, and a lever for operating the valve, in combination with a two-part means for transmitting motion to the lever, one of said parts containing a body of liquid, a cam on the cam shaft for reciprocating one of said parts and governing mechanism for controlling the passage of fluid from one side of one of the parts to the other.

13. In an engine, having a cylinder, a piston, a shaft driven by the piston, a conduit, a valve for controlling the flow of fluid between the conduit and the cylinder, and a lever for operating the valve, the combination of means for transmitting motion from the shaft to the lever, said means including a divided actuator, means for moving the parts of the actuator through a fluid medium, and governing mechanism for regulating the action of the fluid medium to cause it to connect and disconnect the parts of the actuator.

14. In an engine, having a cylinder, a piston, a shaft driven by the piston, a conduit, a valve controlling the flow of fluid between the conduit and the cylinder, and a lever for operating the valve, the combination of a divided means for transmitting motion from the shaft to the lever including a hydraulic piston and a cylinder carried respectively by the parts of said means, and a device for locking the piston and cylinder against relative movement, and governing mechanism for controlling the action of said device.

15. In an engine, having a main piston and cylinder, a conduit, and a valve controlling the passage of fluid between the engine cylinder and the conduit, the combination of a divided valve rod, a spring that acts on the part of the rod that is connected to the valve and tends to close said valve, a connecting means for the parts of the rod including a piston and a cylinder, a body of liquid in the cylinder, a valve in the last-named piston that permits a flow from one side of said piston to the other but prevents flow in the opposite direction, a by-pass around said piston from one end of the cylinder to the other, means for regulating the flow through the by-pass, and governing mechanism for controlling said means.

16. In an engine, having a cylinder, a piston, a shaft driven by the piston, a conduit, and a valve controlling the passage of fluid between the conduit and the cylinder, the combination of a divided valve rod having its parts in axial alinement, means driven by the shaft for imparting motion to the outer end of one of said parts, the outer end of the other part being connected to the valve, a hydraulic device for connecting and disconnecting the adjacent ends of said parts, and governing mechanism for controlling the action of said device.

In witness whereof, I have hereunto set my hand this twentieth day of February, 1906.

ELIHU THOMSON.

Witnesses:
  JOHN A. McMANUS, Jr.,
  HENRY O. WESTENDARP.